United States Patent
Hong

(10) Patent No.: US 12,133,129 B2
(45) Date of Patent: Oct. 29, 2024

(54) METHOD FOR DETERMINING NETWORK SWITCH RESOURCE AND METHOD FOR CONFIGURING NETWORK SWITCH RESOURCE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 410 days.

(21) Appl. No.: 17/614,439

(22) PCT Filed: May 29, 2019

(86) PCT No.: PCT/CN2019/088986
§ 371 (c)(1),
(2) Date: Nov. 26, 2021

(87) PCT Pub. No.: WO2020/237522
PCT Pub. Date: Dec. 3, 2023

(65) Prior Publication Data
US 2022/0240143 A1 Jul. 28, 2022

(51) Int. Cl.
*H04W 36/00* (2009.01)
*H04W 36/06* (2009.01)
*H04W 36/14* (2009.01)
*H04W 88/06* (2009.01)

(52) U.S. Cl.
CPC ....... *H04W 36/06* (2013.01); *H04W 36/0055* (2013.01); *H04W 36/14* (2013.01); *H04W 88/06* (2013.01)

(58) Field of Classification Search
CPC ... H04W 36/00–385; H04W 76/15–16; H04W 76/38; H04W 36/06; H04W 36/0055; H04W 36/14; H04W 88/06; H04W 76/28; H04W 76/16
See application file for complete search history.

(56) References Cited

U.S. PATENT DOCUMENTS

| | | |
|---|---|---|
| 2010/0267378 A1 | 10/2010 | Hamabe et al. |
| 2013/0150036 A1* | 6/2013 | Pattaswamy .......... H04W 76/15 455/435.1 |

FOREIGN PATENT DOCUMENTS

| | | |
|---|---|---|
| EP | 2605561 A1 | 6/2013 |
| WO | WO 2018129875 A1 | 7/2018 |

OTHER PUBLICATIONS

Indian Patent Application No. 202147060686, Office Action dated Jun. 7, 2022, 6 pages.

(Continued)

*Primary Examiner* — Ronald Eisner
(74) *Attorney, Agent, or Firm* — Cozen O'Connor

(57) ABSTRACT

A method for determining a network switch resource is applicable to a terminal that is connected to at least two operator networks. The method includes: receiving first configuration information sent by a first operator network; determining a preset duration for disconnection from the first operator network based on the first configuration information; and disconnecting from the first operator network and performing activities in a second operator network for a duration less than or equal to the preset duration and with a preset limit moment as a boundary.

10 Claims, 9 Drawing Sheets

(56) References Cited

OTHER PUBLICATIONS

European Patent Application No. 19931258.8, Search and Opinion dated Dec. 21, 2022, 12 pages.
Indian Patent Application No. 202147060686 Office Action dated Jul. 5, 2024, 2 pages.

* cited by examiner

METHOD FOR DETERMINING NETWORK SWITCH RESOURCE AND METHOD FOR CONFIGURING NETWORK SWITCH RESOURCE

CROSS-REFERENCE TO RELATED APPLICATION

This application is the US national application of International Application No. PCT/CN2019/088986, filed on May 29, 2019, the entire contents of which are incorporated herein by reference for all purposes.

TECHNICAL FIELD

The disclosure relates to the field of communication technologies, and specifically to a method and an apparatus for determining a network switch resource, and a method and an apparatus for configuring a network switch resource.

BACKGROUND

For a mobile phone with multiple SIM (Subscriber Identity Module) cards, taking a dual mobile phone for an example, when the SIM card 1 is connected to a network of an operator A, it may become necessary to perform activities in a network of an operator B through the SIM card 2 at some time, which may cause the mobile phone to be disconnected from the network of operator A.

Since the network of operator A does not know that the disconnection is caused by performing activities in the network of operator B through the SIM card 2 of the mobile phone, the network operator may generally consider there is a problem on the communication connection with the mobile phone and increase power, and may even determine a radio link failure and thus trigger a radio link recovery mechanism.

However, even if the network of the operator A enhances power and even triggers the radio link recovery mechanism, since the mobile phone performs activities in the network of the operator B through the SIM card 2 and the mobile phone may not recover activities in the network of the operator A. This means that the network of the operator A is caused to perform invalid operations, which wastes resources of the network of the operator A.

SUMMARY

According to a first aspect of the disclosure, a method for determining a network switch resource is applied to a terminal for connecting at least two operator networks, and includes: receiving first configuration information sent by the first operator network; determining a preset duration for disconnection from the first operator network based on the first configuration information; and for a duration less than or equal to the preset duration and with a preset limit moment as a boundary, disconnecting from the first operator network and performing activities in a second operator network.

According to a second aspect of the disclosure, a method for configuring a network switch resource is applied to a first operator network, and includes: sending first configuration information to a terminal, the first configuration information is configured to indicate that the terminal is disconnected from the first operator network for a duration less than or equal to a preset duration.

According to a third aspect of the embodiment of the disclosure, an apparatus for determining a network switch resource is provided. The apparatus is applied to a terminal for connecting at least two operator networks, and includes a processor; and a memory configured to store instructions executable by the processor. The processor is configured to receive first configuration information sent by the first operator network; determine a preset duration for disconnection from the first operator network based on the first configuration information; and for a duration less than or equal to the preset duration and with a preset limit moment as a boundary, disconnect from the first operator network and perform activities in a second operator network of the at least two operator networks.

BRIEF DESCRIPTION OF THE DRAWINGS

In order to explain the technical solutions in embodiments of the disclosure more clearly, the drawings used in descriptions of the embodiments will be briefly introduced below. Obviously, the drawings described below are aimed at only some embodiments of the disclosure. Those skilled in the art may obtain other drawings from the drawings without creative work.

DETAILED DESCRIPTION

The technical solutions in the embodiments of the disclosure are described clearly and completely below with reference to the accompanying drawings in the embodiments of the disclosure, and it is apparent that the described embodiments are only a part of the embodiments of the disclosure, rather than all of the embodiments. All other embodiments obtained by those skilled in the art based on the embodiments of the present disclosure without any creative efforts should belong to the protection scope of the present disclosure.

Figure 1:
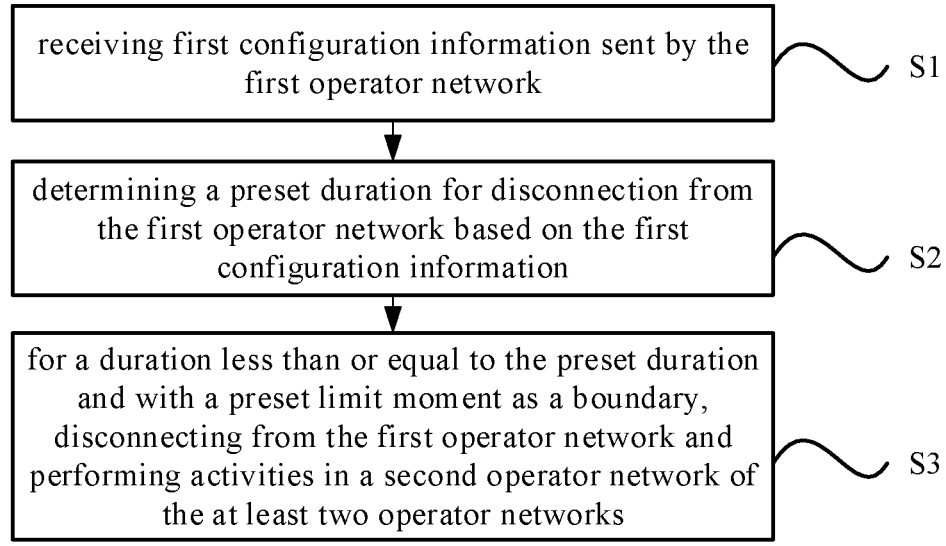
FIG. 1 is a flowchart illustrating a method for determining a network switching resource in the embodiment of the disclosure.

FIG. 1 is a flowchart illustrating a method for determining a network switching resource in the embodiment of the disclosure. The paging response method as illustrated in the embodiment of the disclosure is applicable to a terminal. The terminal may perform communication based on a multi-SIM single-standby (for example, dual-SIM single-standby) mode, or a multi-SIM multi-standby (for example, dual-SIM dual-standby) mode, or multi-SIM multi-standby multi-pass (for example, dual-SIM dual-standby dual-pass) mode.

The terminal may be configured to connect at least two operator networks, for example, a terminal may serve as a user equipment to communicate with a base station in an operator network, the terminal may be provided with a plurality of SIM cards, where the SIM card specifically may be a universal subscriber identity module (USIM), the SIM card 1 in the plurality of SIM cards may be connected to a first operator network, and the SIM card 2 in the plurality of SIM cards may be connected to a second operator network. The first operator network and the second operator network are networks provided by different operators, for example, the first operator network may be a mobile network, and the second operator network may be a Unicom network or a Telecommunications network.

As illustrated in FIG. 1, the method for determining a network switching resource includes the following steps.

At S1, first configuration information sent by the first operator network is received.

In an embodiment, the user equipment may be connected to the first operator network, and the first configuration information may be received from the first operator network when the user equipment is connected to the first operator network at this time, and may also be received from the first operator network when the user equipment is connected to the first operator network at any time before this time.

In an embodiment, when the first operator network is connected to the terminal, first configuration information may be sent to the terminal and be configured to indicate that the terminal is disconnected from the first operator network for a duration less than or equal to a preset duration.

The preset duration may be determined based on a set value which is preset by the first operator network or based on communication parameters for communication with the terminal. The first configuration information may be generated based on the preset duration and sent to the terminal, in which the first configuration information is configured to indicate that the terminal is disconnected from the first operator network for a duration less than or equal to a preset duration.

The communication parameters are configured to represent stability requirements for communication between the first operator network and the terminal, and specifically, the communication parameters include but not limited to communication quality, and a type of communication service.

Taking the communication quality as a communication parameter for an example, the communication quality may be determined by parameters such as a reference signal receiving power (RSRP), a received signal strength indication (RSSI).

When the communication quality is poor, its impact on communication needs to be avoided as much as possible to ensure good communication quality. It may be determined that the communication between the first operator network and the terminal has a relatively high requirement for stability, and the preset duration may be relatively short, that is, the user equipment is only allowed to be disconnected from the first operator network within a short period of time, to reduce the impact of the disconnection between the user equipment and the first operator network on the communication quality.

When the communication quality is poor, its impact on communication needs to be avoided as much as possible to ensure good communication quality. It may be determined that the communication between the first operator network and the terminal has a relatively high requirement for stability, and the preset duration may be relatively short, that is, the user equipment is only allowed to be disconnected from the first operator network within a short period of time to reduce the impact of the disconnection between the user equipment and the first operator network on the communication quality.

At S2, a preset duration for disconnection from the first operator network is determined based on the first configuration information.

At S3, it is disconnected from the first operator network and activities are performed in a second operator network of the at least two operator networks for a duration less than or equal to the preset duration and with a preset limit moment as a boundary.

The activities include at least one of: monitoring a paging message sent by the second operator network; in response to the paging message sent by the second operator network, measuring communication information of the second operator network, receiving a system message sent by the second operator network, and updating a tracking area in the second operator network.

In an embodiment, since the first operator network does not know information of the terminal interacting in the second operator network, for example, a cycle of the paging message sent by the second operator network, a cycle of the system message sent by the second operator network, it is not specifically determined which time domain resources are appropriate to configure for the terminal to perform activities in the second operator network.

However, the first operator network may determine the preset duration of the terminal disconnected from the first operator network, and configure the preset duration for the terminal through the first configuration information. When the terminal determines the preset duration based on the first configuration information, there is a certain flexibility for when to disconnect from the first operator network and perform activities in the second operator network.

The terminal may determine a preset limit moment by itself, for example, a start moment and/or an end moment in disconnecting from the first operator network and performing activities in the second operator network.

Taking a preset limit moment being a start moment for an example, the terminal may determine the start moment by itself, and may be disconnected from the first operator network and perform activities in the second operator network for a duration less than or equal to the preset duration starting from the start moment.

Taking a preset limit moment being an end moment for an example, the terminal may determine the end moment by itself, and may be disconnected from the first operator network and perform activities in the second operator network for a duration less than or equal to the preset duration until the end moment.

Taking a preset limit moment including a start moment and an end moment for an example, the terminal may determine the start moment and the end moment by itself, and may be disconnected from the first operator network and perform activities in the second operator network for a duration less than or equal to the preset duration from the start moment to the end moment. In this case, the preset duration may be equal to a duration from the start moment to the end moment.

The terminal may determine the preset limit moment by itself based on communication parameters and service type with the first operator network at the preset limit moment, or based on a predetermined limit moment of performing activities in the second operator network.

For example, the terminal predetermines a limit moment of performing activities in the second operator network, and the communication quality of communication with the first operator is relatively high at this limit moment, so disconnection from the first operator network at the limit moment may not affect communication with the first operator, and the limit moment may be taken as a preset limit moment.

For example, the terminal predetermines a limit moment of performing activities in the second operator network, and the time delay allowed by the service type of communication data with the first operator is relatively low at the limit moment, so disconnection from the first operator network at the limit moment may not seriously affect the time delay requirement for the service type of communication data with the first operator, and the limit moment may be taken as a preset limit moment.

In the embodiment of the disclosure, the terminal determines a preset duration for disconnection from the first operator network based on the first configuration information sent by the first operator network. Further, the terminal may be disconnected from the first operator network for a duration less than or equal to the preset duration and with a preset limit moment as a boundary, and perform activities in a second operator network.

During the process, although the first operator network does not specifically configure time domain resources for the terminal to perform activities in the second operator network, a preset duration may be configured for the terminal so that the terminal may have a certain flexibility to determine a preset limit moment of the preset duration by itself, during which the first operator network does not need to interact with the second operator network and consumption caused by interactions between operator networks may be thus reduced.

Furthermore, a preset duration is configured by the first operator network for the terminal and known by the first operator network. In response to the duration of the terminal disconnected from the terminal being not greater than the preset duration, the first operator network may not mistakenly consider that there is a problem on the communication connection with the terminal, and may not perform misoperations such as increasing power and even triggering a radio link recovery mechanism, which effectively avoids waste of resources of the first operator network.

Optionally, the preset duration is a duration within a unit time period.

In an embodiment, a preset duration may be an independent duration, for example, 5 ms. In this case, the user equipment may be disconnected from the first operator network and perform activities in the second operator network for a duration less than or equal to 5 ms.

In an embodiment, a preset duration may be a duration within a unit time period, for example, 5 ms in each 20 ms. In this case, the user equipment may be disconnected from the first operator network and perform activities in the second operator network for a duration less than or equal to 5 ms in each 20 ms.

The unit time period may be configured based on the requirements but not limited to 20 ms as described in the above embodiments. The duration within the unit time period may be a continuous duration, for example, continuous 5 ms in 20 ms, and also may be a plurality of discrete durations, for example, five 1 ms in 20 ms.

Figure 2:
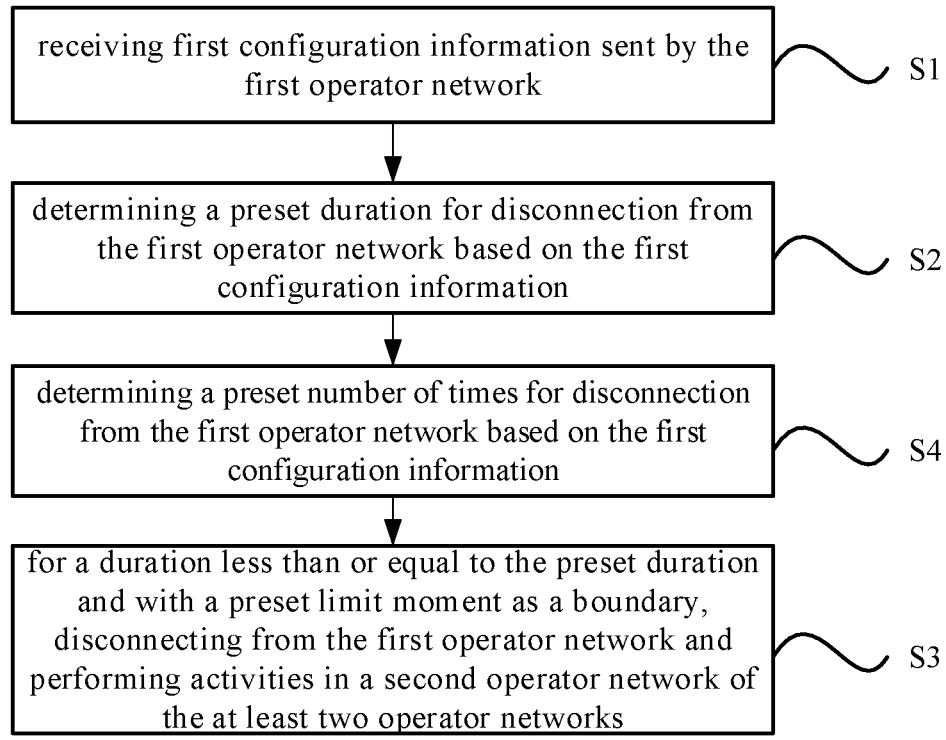
FIG. 2 is a flowchart illustrating another method for determining a network switching resource in the embodiment of the disclosure.

FIG. 2 is a flowchart illustrating another method for determining a network switching resource in the embodiment of the disclosure. As illustrated in FIG. 2, the method further includes the step at S4.

At S4, a preset number of times for disconnection from the first operator network is determined based on the first configuration information. The execution sequence of the step at S4 may be adjusted based on requirements, for example, may be executed with the step at S2 simultaneously, and also may be executed before the step at S2, and also may be executed after the step at S2.

In an embodiment, the base station may also configure a preset number of times in addition to the preset duration for the terminal based on the first configuration information, and the terminal may determine the preset number of times for disconnection from the first operator network based on the first configuration information, so that it is achieved to flexibly indicate a rule that the terminal is disconnected from the first operator network.

Figure 3:
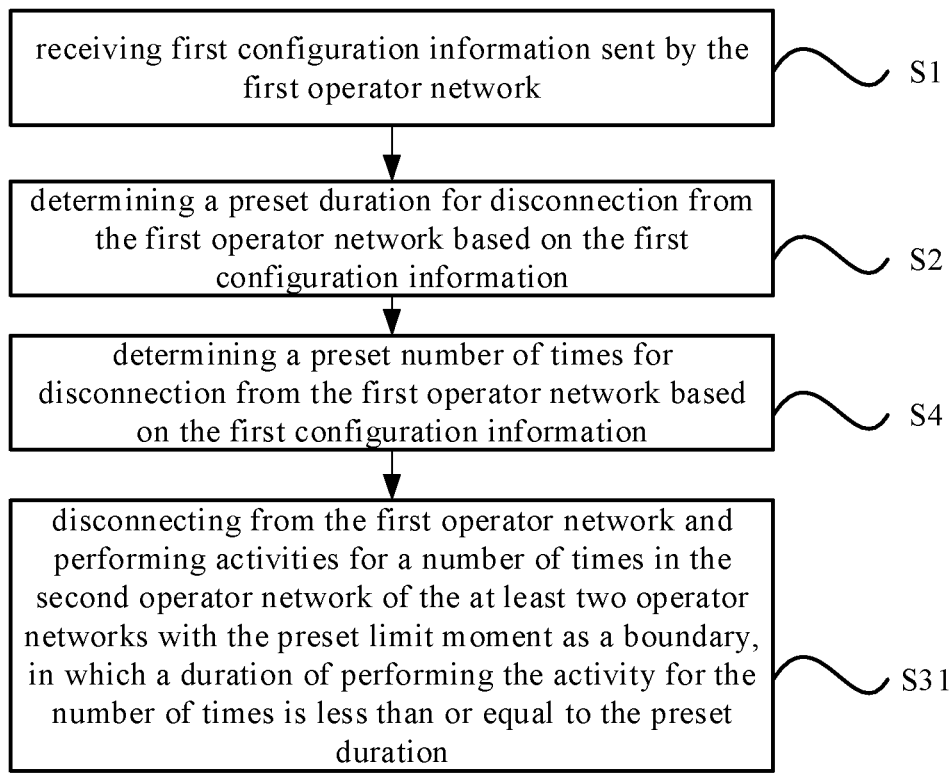
FIG. 3 is a flowchart illustrating yet another method for determining a network switching resource in the embodiment of the disclosure.

FIG. 3 is a flowchart illustrating yet another method for determining a network switching resource in the embodiment of the disclosure. As illustrated in FIG. 3, for a duration less than or equal to the preset duration and with a preset limit moment as a boundary, disconnecting from the first operator network and performing activities in a second operator network of the at least two operator networks, includes the step at S31.

At S31, the terminal is disconnected from the first operator network and activities are performed for a preset number of times in the second operator network of the at least two operator networks with the preset limit moment as a boundary, in which a duration of performing the activity for the number of times is less than or equal to the preset duration.

In an embodiment, when the user equipment determines a preset duration and a preset number of times based on the first configuration information, it may be disconnected from the first operator network and perform activities for the number of times in the second operator network with the preset limit moment as a boundary, in which a duration for performing the number of times of activities is less than or equal to the preset duration.

For example, the preset duration is 5 ms, and the preset number of times is 5, it may be disconnected from the first operator network and activities are performed for 5 times in the second operator network with the preset limit moment as a boundary, in which a duration of performing activities for 5 times is less than or equal to 5 ms. That is, the upper limit of a sum of durations of performing activities for 5 times is 5 ms.

Figure 4:
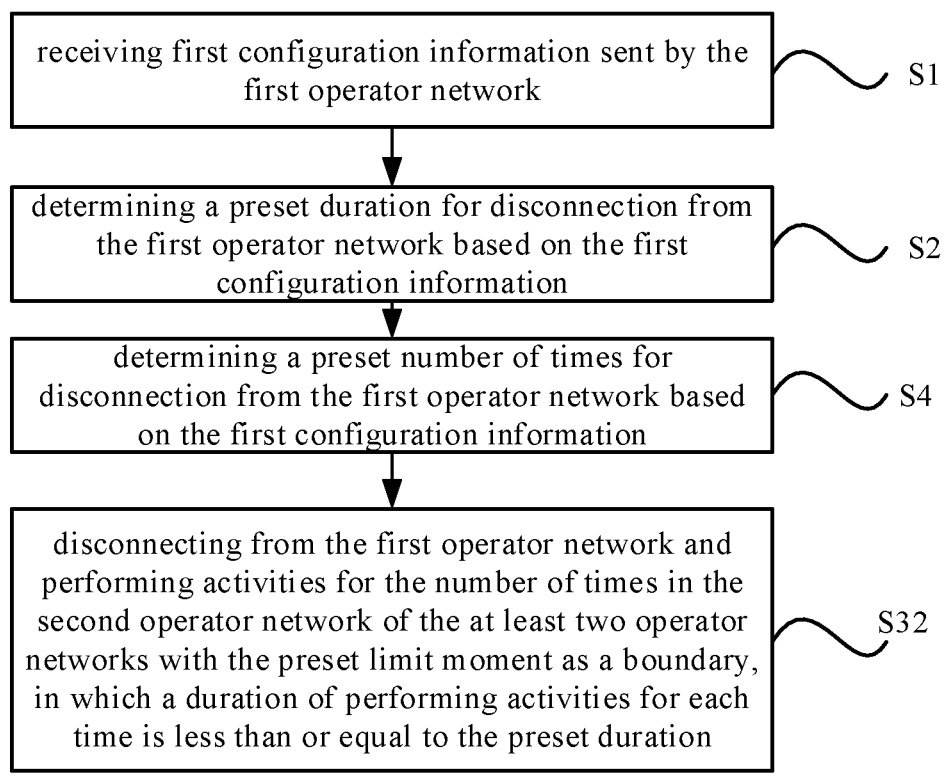
FIG. 4 is a flowchart illustrating yet another method for determining a network switching resource in the embodiment of the disclosure.

FIG. 4 is a flowchart illustrating yet another method for determining a network switching resource in the embodiment of the disclosure. As illustrated in FIG. 4, for a duration less than or equal to the preset duration and with a preset limit moment as a boundary, disconnecting from the first operator network and performing activities in a second operator network of the at least two operator networks, includes the step at 32:

At S32, it is disconnected from the first operator network and activities are performed for a number of times in the second operator network of the at least two operator networks with the preset limit moment as a boundary, in which a duration of performing activities for each time is less than or equal to the preset duration.

In an embodiment, when the user equipment determines a preset duration and a preset number of times based on the first configuration information, it may be disconnected from the first operator network and activities may be performed for the number of times in the second operator network with the preset limit moment as a boundary, in which a duration of performing activities for each time is less than or equal to the preset duration.

For example, the preset duration is 5 ms, and the preset number of times is 5, it may be disconnected from the first operator network and activities may be performed for 5 times in the second operator network with the preset limit moment as a boundary, in which a duration of performing activities for each time is less than or equal to 5 ms. That is, the upper limit of a duration of performing activities for each time is 5 ms.

Optionally, the preset number of times is a number of times within a unit time period.

In an embodiment, a preset number of times may be an independent number of times, for example, 5 times. A preset number of times may be a number of times within a unit time period, for example, 5 times in each 20 ms. In this case, the user equipment may be disconnected from the first operator network and perform activities in the second operator network for 5 times in each 20 ms.

The unit time period may be configured based on requirements but not limited to 20 ms as described in the above embodiments.

Figure 5:
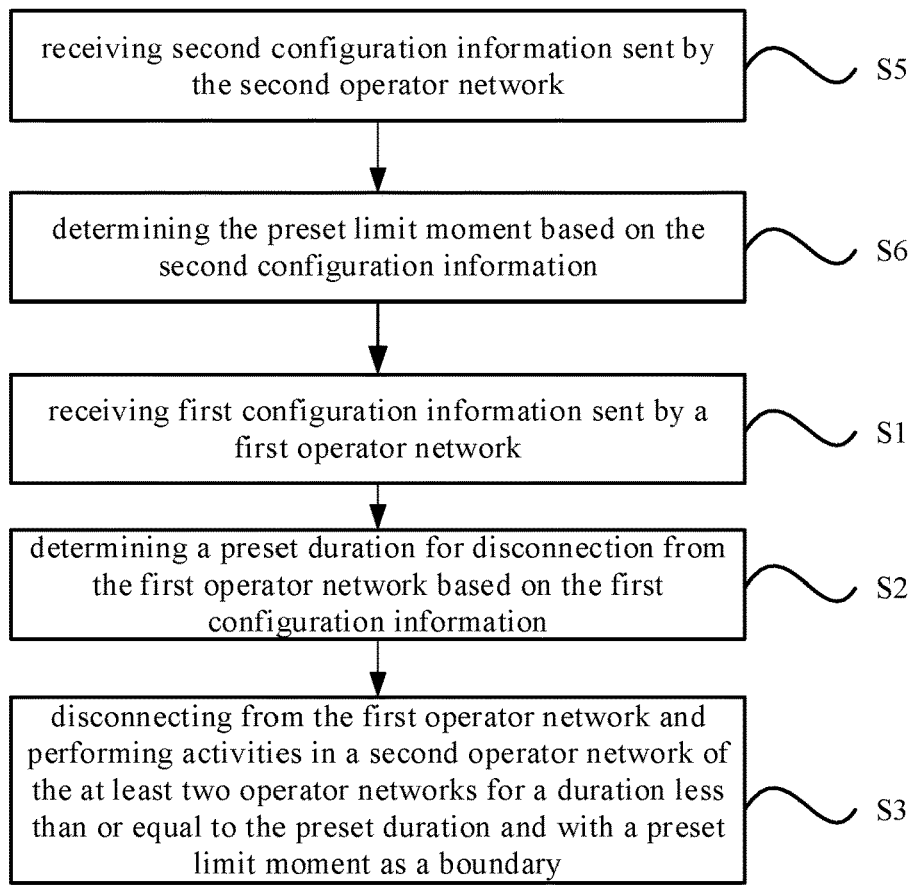
FIG. 5 is a flowchart illustrating yet another method for determining a network switching resource in the embodiment of the disclosure.

FIG. 5 is a flowchart illustrating yet another method for determining a network switching resource in the embodiment of the disclosure. As illustrated in FIG. 5, the method further includes the steps at S5 and S6.

At S5, second configuration information sent by the second operator network is received.

At block S6, the preset limit moment is determined based on the second configuration information.

The execution sequence of S5 and S6 may be adjusted according to the requirement, and only needs to ensure executed before S3.

In an embodiment, the second operator network may send second configuration information to the terminal, and the terminal may determine a preset limit moment based on the second configuration information. For example, the second configuration information may indicate a start moment when the terminal performs activities in the second operator network, and the terminal may take the start moment as a preset limit moment.

Figure 6:
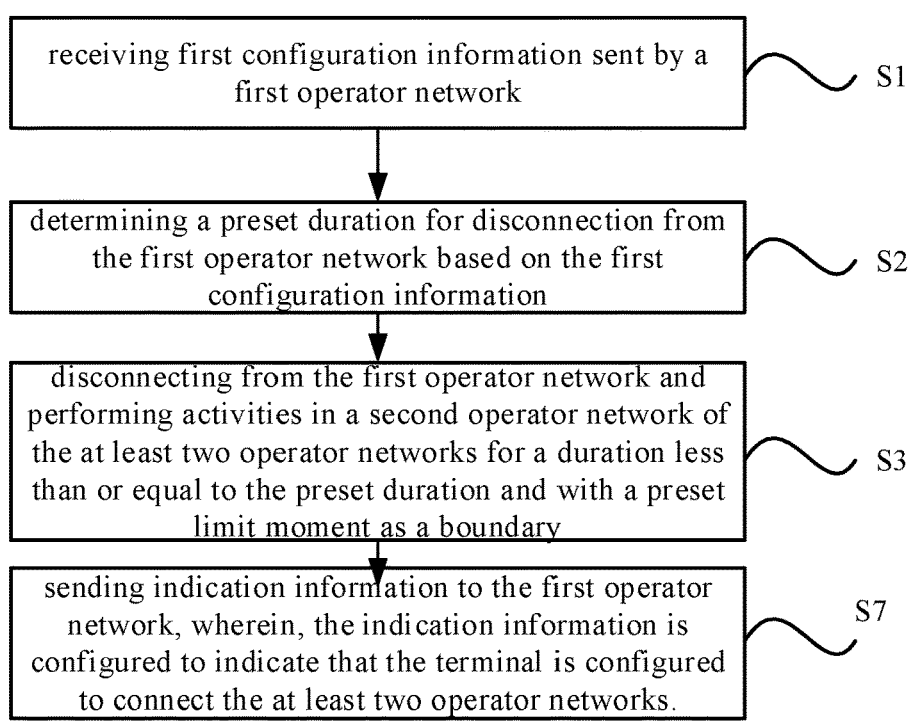
FIG. 6 is a flowchart illustrating yet another method for determining a network switching resource in the embodiment of the disclosure.

FIG. 6 is a flowchart illustrating yet another method for determining a network switching resource in the embodiment of the disclosure. As illustrated in FIG. 6, the method further includes the step at S7.

At S7, indication information is sent to the first operator network, in which the indication information is configured to indicate that the terminal is connected to at least two operator networks.

In an embodiment, a terminal may send indication information to a first operator network, so as to indicate the first operator network that the terminal is configured to connect the at least two operator networks, that is, inform the first operator network that the terminal is a multi-SIM multi-standby terminal, so that only when it is determined that the terminal is a multi-SIM multi-standby terminal, the first operator network may determine a preset duration based on the communication parameters of communication with the terminal, generate and send the first configuration information to the terminal.

Optionally, the limit moment includes at least one of: a start moment, and an end moment.

Figure 7:
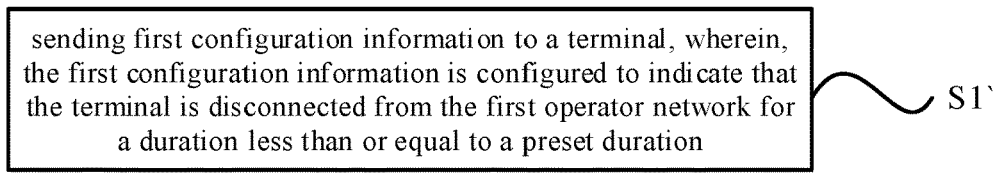
FIG. 7 is a flowchart illustrating a method for configuring a network switching resource in the embodiment of the disclosure.

FIG. 7 is a flowchart illustrating a method for configuring a network switching resource in the embodiment of the disclosure. The method for configuring a network switch resource as illustrated in the embodiment of the disclosure may be applied to a first operator network, for example, the first operator network in the above embodiment. The first operator network may establish a communication connection with a terminal, for example, may establish a connection with the SIM card 1 in the plurality of SIM cards in the terminal.

As illustrated in FIG. 7, the method for configuring a network switching resource may include the following steps:

At S1', first configuration information is sent to a terminal, in which the first configuration information is configured to indicate that the terminal is disconnected from the first operator network for a duration less than or equal to a preset duration.

In an embodiment, when the first operator network is connected to the terminal, first configuration information may be sent to the terminal, the first configuration information being configured to indicate that the terminal is disconnected from the first operator network for a duration less than or equal to a preset duration.

The preset duration may be determined based on a preset value of the first operator network or based on communication parameters for communication with the terminal. The first configuration information may be generated based on the preset duration and sent to the terminal, the first configuration information being configured to indicate that the terminal is disconnected from the first operator network for a duration less than or equal to a preset duration.

In the embodiment of the disclosure, the terminal determines a preset duration for disconnection from the first operator network based on the first configuration information sent by the first operator network, and may be disconnected from the first operator network and perform activities in a second operator network for a duration less than or equal to the preset duration and with a preset limit moment as a boundary.

During the process, although the first operator network does not specifically configure time domain resources for the terminal to perform activities in the second operator network, a preset duration may be configured for the terminal so that the terminal may have a certain flexibility to determine a preset limit moment of the preset duration by itself, during which the first operator network does not need to interact with the second operator network and consumption caused by interactions between operator networks may be thus reduced.

Furthermore, a preset duration is configured for the terminal by the first operator network and known by the first operator network. In response to the duration of the terminal disconnected from the terminal being not greater than the preset duration, the first operator network may not mistakenly consider that there is a problem on the communication connection problem with the terminal, and may not perform mis-operations such as increasing power and even triggering a radio link recovery mechanism, which effectively avoids waste of resources of the first operator network.

Figure 7A:
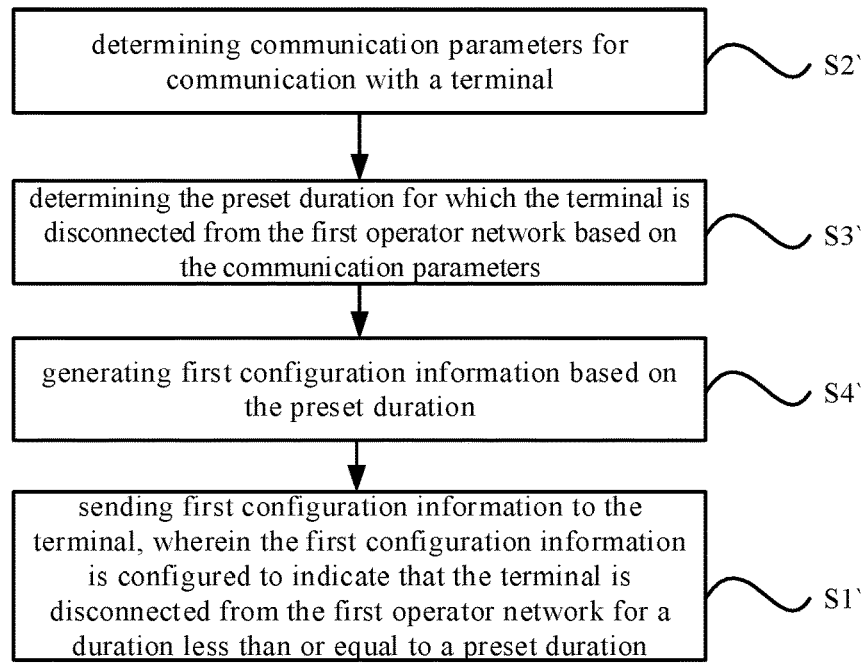
FIG. 7A is a flowchart illustrating another method for configuring a network switching resource in the embodiment of the disclosure.

FIG. 7A is a flowchart illustrating another method for configuring a network switching resource in the embodiment of the disclosure. As illustrated in FIG. 7, the method further includes the following steps.

At S2', communication parameters for communication with a terminal are determined.

At S3', the preset duration for which the terminal is disconnected from the first operator network is determined based on the communication parameters.

At S4', the first configuration information is generated based on the preset duration.

In an embodiment, when the first operator network is connected to the terminal, communication parameters of communication with the terminal may be determined, the preset duration for which the terminal is disconnected from the first operator network may be further determined based on the communication parameters, and the first configuration information may be generated based on the preset duration and sent to the terminal, the first configuration information being configured to indicate that the terminal is disconnected from the first operator network for a duration less than or equal to a preset duration.

The communication parameters are configured to represent stability requirements for communication between the first operator network and the terminal, and specifically, the communication parameters include but not limited to communication quality, and a type of communication service.

Taking the communication quality as a communication parameter for an example, the communication quality may be determined by parameters such as an RSRP, an RSSI.

When the communication quality is poor, its impact on communication needs to be avoided as much as possible to ensure good communication quality. It may be determined that the communication between the first operator network and the terminal has a relatively high requirement for stability, and the preset duration may be relatively short, that is, the user equipment is only allowed to be disconnected from the first operator network within a short period of time, to reduce the impact of the disconnection between the user equipment and the first operator network on the communication quality.

When the communication quality is poor, its impact on communication needs to be avoided as much as possible to ensure good communication quality. It may be determined that the communication between the first operator network and the terminal has a relatively high requirement for stability, and the preset duration may be relatively short, that is, the user equipment is only allowed to be disconnected from the first operator network within a short period of time to reduce the impact of the disconnection between the user equipment and the first operator network on the communication quality.

Optionally, the communication parameters include at least one of: communication quality, and a type of communication service.

Optionally, the preset duration includes a duration within a unit time period.

Optionally, the first configuration information is further configured to indicate that a number of times of the terminal disconnected from the first operator network is a preset number of times.

Optionally, the preset duration is a sum of durations for which the terminal is disconnected from the first operator network for the preset number of times.

Optionally, the preset duration is a duration for which the terminal is disconnected from the first operator network for each of the preset number of times.

Optionally, the preset number of times is a number of times within a unit time period.

Figure 8:
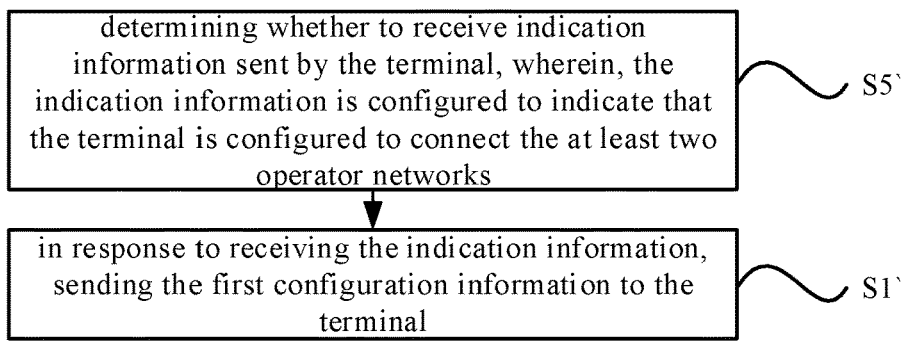
FIG. 8 is a flowchart illustrating yet another method for configuring a network switching resource in the embodiment of the disclosure.

FIG. 8 is a flowchart illustrating yet another method for configuring a network switching resource in the embodiment of the disclosure. As illustrated in FIG. 8, the method further includes the following step.

At S5', it is determined whether to receive indication information sent by the terminal, in which the indication information is configured to indicate that the terminal is connected to the at least two operator networks; and in response to receiving the indication information, execute the step at S1', that is, the first configuration information is sent to a terminal.

Figure 9:
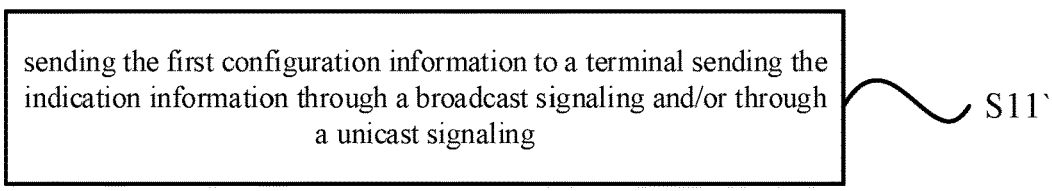
FIG. 9 is a flowchart illustrating yet another method for configuring a network switching resource in the embodiment of the disclosure.

FIG. 9 is a flowchart illustrating yet another method for configuring a network switching resource in the embodiment of the disclosure. As illustrated in FIG. 9, sending the first configuration information to a terminal, includes the steps at S11'.

At S11', the first configuration information is sent to a terminal sending the indication information through a broadcast signaling and/or through a unicast signaling.

In an embodiment, after the first operator network receives the indication information, the configuration information may be sent to the terminal sending the indication information in the form of a broadcast signaling; and/or the configuration information may be sent to a terminal sending the indication information in the form of a unicast signaling.

Figure 10:
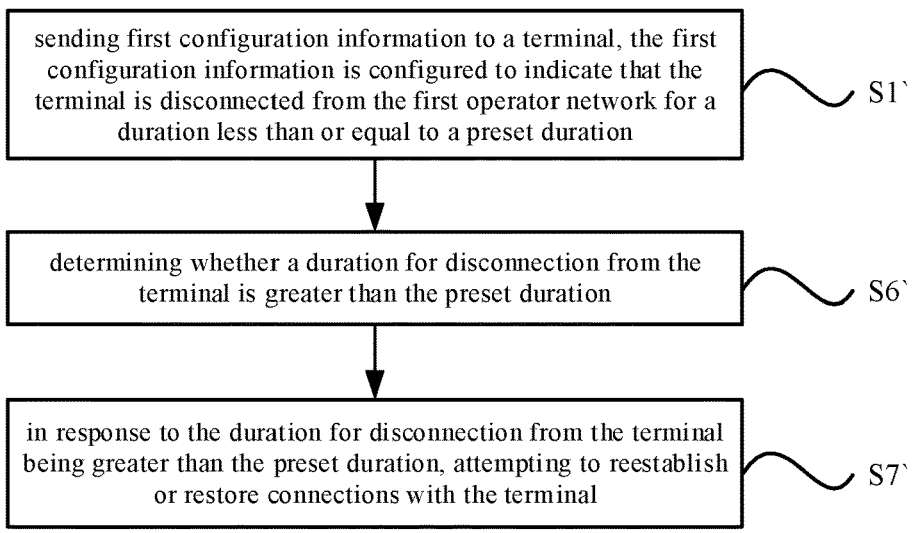
FIG. 10 is a flowchart illustrating yet another method for configuring a network switching resource in the embodiment of the disclosure.

FIG. 10 is a flowchart illustrating yet another method for configuring a network switching resource in the embodiment of the disclosure. As illustrated in FIG. 10, the method further includes the steps at S6' and S7'.

At S6', it is determined whether a duration for disconnection from the terminal is greater than the preset duration.

At S7', in response to the duration for disconnection from the terminal being greater than the preset duration, connections with the terminal attempt to be reestablished, or the connections with the terminal attempt to be restored.

In an embodiment, a preset duration may be determined based on communication parameters for communication between the first operator network and the terminal. The first operator network may configure the preset duration based on the communication parameters for communication with the terminal, so that the terminal communicates with the first operator network for the preset duration without great impacts on the communication between the first operator network and the terminal.

Therefore, in response to the duration of the terminal disconnected from the terminal being not greater than the preset duration, the first operator network may not mistakenly consider that there is a problem on the communication connection with the terminal, and may not perform misoperations such as increasing power and even triggering a radio link recovery mechanism.

However, in response to the duration for which the terminal is disconnected from the first operator network being not greater than the preset duration, it may be determined that there is a connection problem between the terminal and the first operator network, rather than to perform activities in a second operator network based on the configured preset duration. Therefore, it is attempted to reestablish connections with the terminal, or to restore the connections with the terminal, for example, the terminal may be connected to the first operator network for continuing communication by increasing power and triggering the radio link recovery mechanism.

For example, a preset duration may be an independent duration, for example, 5 ms. In this case, in response to the duration of the terminal disconnected from the terminal being greater than 5 ms, it may be determined that there is a connection problem between the terminal and the first operator network.

For example, a preset duration may be a duration within a unit time period, for example, 5 ms in each 20 ms. In this case, when the duration of the terminal disconnected from the terminal is greater than 5 ms within 20 ms, it may be determined that there is a connection problem between the terminal and the first operator network.

Corresponding to the embodiments of the method for determining a network switch resource and the method for configuring a network switch resource, embodiments of the apparatus for determining a network switch resource and the apparatus for configuring a network switch resource are further provided in the disclosure.

Figure 11:
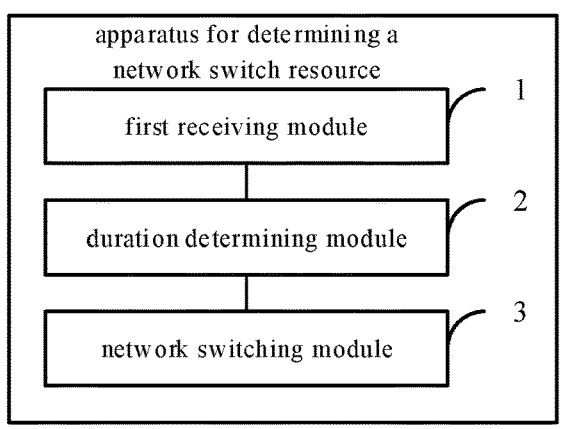
FIG. 11 is a schematic block diagram illustrating an apparatus for determining a network switching resource in the embodiment of the disclosure.

FIG. 11 is a schematic block diagram illustrating an apparatus for determining a network switching resource in the embodiment of the disclosure. The paging response apparatus as illustrated in the embodiment of the disclosure is applicable to a terminal. The terminal may perform communication based on a multi-SIM single-standby (for example, dual-SIM single-standby) mode, or a multi-SIM multi-standby (for example, dual-SIM dual-standby) mode, or a multi-SIM multi-standby multi-pass (for example, dual-SIM dual-standby dual-pass) mode.

The terminal may be configured to connect at least two operator networks, for example, a terminal may serve as a user equipment to communicate with a base station in an operator network, the terminal may be provided with a plurality of SIM cards, and may be specifically a USIM. The SIM card 1 in the plurality of SIM cards may be connected to a first operator network, and the SIM card 2 in the plurality of SIM cards may be connected to a second operator network. The first operator network and the second operator network are networks provided by different operators, for example, the first operator network may be a mobile network, and the second operator network may be a Unicom network or a Telecommunications network.

As illustrated in FIG. 11, the apparatus for determining a network switching resource includes: a first receiving module 1, configured to receive first configuration information sent by the first operator network; and a duration determining module 2, configured to determine a preset duration for disconnection from the first operator network based on the first configuration information; and a network switching module 3, configured to disconnect from the first operator network and perform activities in a second operator network of the at least two operator networks for a duration less than or equal to the preset duration and with a preset limit moment as a boundary.

Optionally, the preset duration is a duration within a unit time period.

Figure 12:
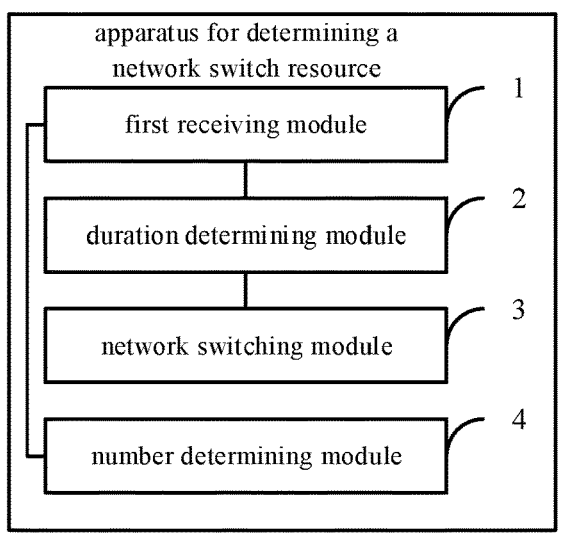
FIG. 12 is a schematic block diagram illustrating another apparatus for determining a network switching resource in the embodiment of the disclosure.

FIG. 12 is a schematic block diagram illustrating another apparatus for determining a network switching resource in the embodiment of the disclosure. As illustrated in FIG. 12, the apparatus further includes: a number determining module 4, configured to determine a preset number of times for disconnection from the first operator network based on the first configuration information.

Optionally, the network switching module is configured to disconnect from the first operator network and perform activities for the number of times in the second operator network of the at least two operator networks with the preset limit moment as a boundary, in which a duration of performing the activities for the number of times is less than or equal to the preset duration.

Optionally, the network switching module is configured to disconnect from the first operator network and perform activities for the number of times in the second operator network of the at least two operator networks with the preset limit moment as a boundary, in which a duration of performing activities for each time is less than or equal to the preset duration.

Optionally, the preset number of times is a number of times within a unit time period.

Figure 13:
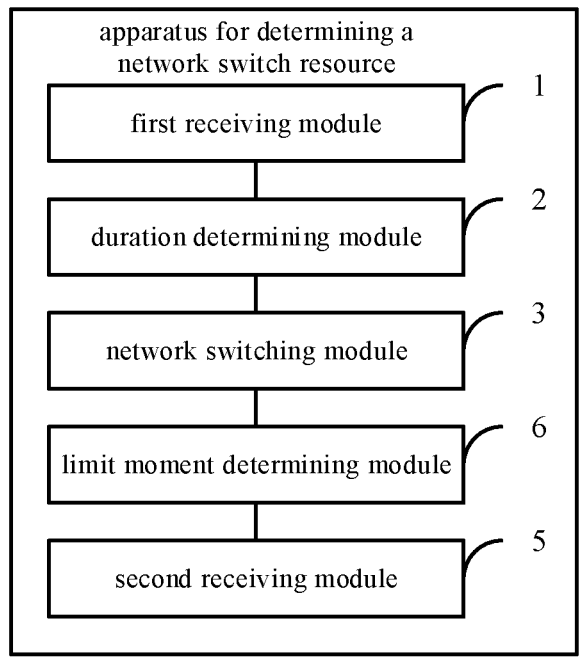
FIG. 13 is a schematic block diagram illustrating yet another apparatus for determining a network switching resource in the embodiment of the disclosure.

FIG. 13 is a schematic block diagram illustrating yet another apparatus for determining a network switching resource in the embodiment of the disclosure. As illustrated in FIG. 13, the apparatus further includes: a second receiving module 5, configured to receive second configuration information sent by the second operator network; and a limit moment determining module 6, configured to determine the preset limit moment based on the second configuration information.

Figure 14:
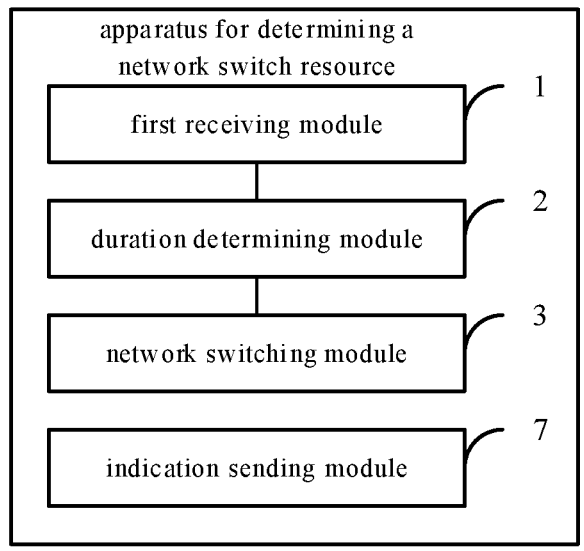
FIG. 14 is a schematic block diagram illustrating yet another apparatus for determining a network switching resource in the embodiment of the disclosure.

FIG. 14 is a schematic block diagram illustrating yet another apparatus for determining a network switching resource in the embodiment of the disclosure. As illustrated in FIG. 14, the apparatus further includes: an indication sending module 7, configured to send indication information to the first operator network, in which the indication information is configured to indicate that the terminal is connected to the at least two operator networks.

Optionally, the limit moment includes at least one of: a start moment, and an end moment.

Figure 15:
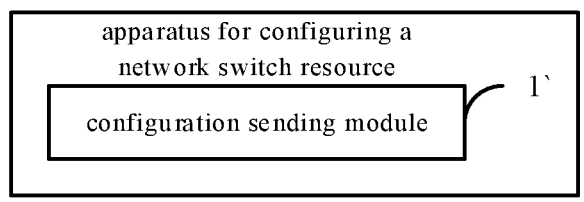
FIG. 15 is a schematic block diagram illustrating an apparatus for configuring a network switching resource in the embodiment of the disclosure.

FIG. 15 is a schematic block diagram illustrating an apparatus for configuring a network switching resource in the embodiment of the disclosure. The apparatus for configuring a network switch resource as illustrated in the embodiment of the disclosure may be applied to a first operator network, for example, the first operator network in the above embodiment, the first operator network may establish a communication connection with a terminal, for example, may establish a connection with the SIM card 1 in the plurality of SIM cards in the terminal.

As illustrated in FIG. 15, the apparatus for determining a network switching resource includes: a configuration sending module 4', configured to send first configuration information to a terminal, in which the first configuration information is configured to indicate that the terminal is disconnected from the first operator network for a duration less than or equal to a preset duration.

Figure 15A:
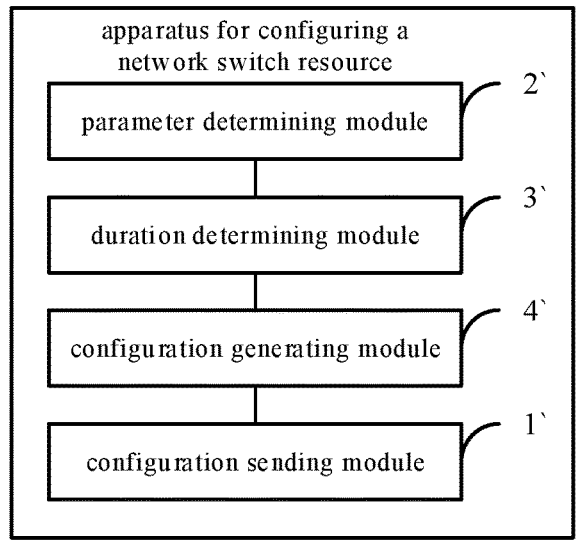
FIG. 15A is a schematic block diagram illustrating another apparatus for configuring a network switching resource in the embodiment of the disclosure.

FIG. 15A is a schematic block diagram illustrating another apparatus for configuring a network switching resource in the embodiment of the disclosure. The apparatus further includes a parameter determining module 1', configured to determine communication parameters for communication with the terminal; and a duration determining module 2', configured to determine the preset duration for which the terminal is disconnected from the first operator network based on the communication parameters; and a configuration generating module 3', configured to generate the first configuration information based on the preset duration.

Optionally, the communication parameters include at least one of: communication quality, and a type of communication service.

Optionally, the preset duration includes a duration within a unit time period.

Optionally, the first configuration information is further configured to indicate that a number of times of the terminal disconnected from the first operator network is a preset number of times.

Optionally, the preset duration is a sum of durations for which the terminal is disconnected from the first operator network for the preset number of times.

Optionally, the preset duration is a duration of the terminal disconnected from the first operator network for each of the preset number of times.

Optionally, the preset number of times includes a number of times within a unit time period.

Figure 16:
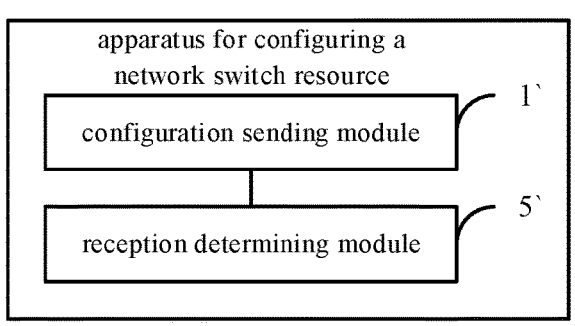
FIG. 16 is a schematic block diagram illustrating yet another apparatus for configuring a network switching resource in the embodiment of the disclosure.

FIG. 16 is a schematic block diagram illustrating another apparatus for configuring a network switching resource in the embodiment of the disclosure. As illustrated in FIG. 16, the apparatus further includes: a receiving determining module 5', configured to determine whether to receive indication information sent by the terminal, in which the indication information is configured to indicate that the terminal is connected to the at least two operator networks; and the configuration sending module 1', configured to, in response to determining receiving the indication information, send the first configuration information to the terminal.

Optionally, the configuration sending module is configured to send the first configuration information to a terminal sending the indication information through a broadcast signaling and/or through a unicast signaling.

Figure 17:
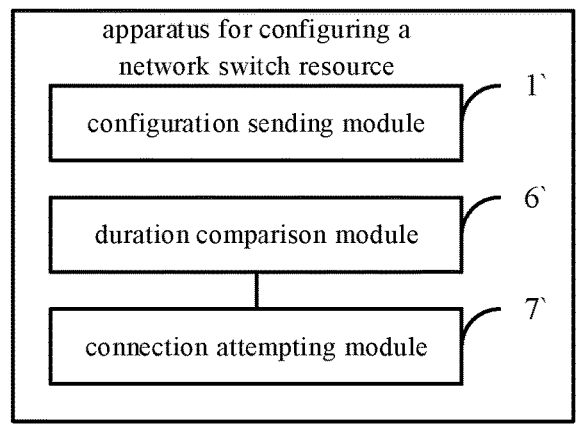
FIG. 17 is a schematic block diagram illustrating yet another apparatus for configuring a network switching resource in the embodiment of the disclosure.

FIG. 17 is a schematic block diagram illustrating another apparatus for configuring a network switching resource in the embodiment of the disclosure. As illustrated in FIG. 17, the apparatus further includes: a duration comparison module 6', configured to determine whether a duration for disconnection from the terminal is greater than the preset duration; and a connection attempting module 7', configured to, in response to the duration for disconnection from the terminal being greater than the preset duration, attempt to reestablish or restore connections with the terminal.

With regard to the apparatus in the embodiments, the specific way in which each module performs the operation has been described in detail in the embodiments of the method and will not be elaborated here.

Since the apparatus embodiments basically correspond to the method embodiments, please refer to part of descriptions of the method embodiments for relevant information. The above apparatus embodiments are merely exemplary, the modules described as separate components may or may not be physically separated, and components displayed as modules may or may not be physical modules, that is, may be located in one place, or may be distributed on a plurality of network modules. Some or all of the modules may be selected according to actual requirements to achieve the solutions in the embodiments. Those skilled in the art may understand and implement the method without any creative effort.

According to the embodiment of the disclosure, an electronic device includes: a processor; and a memory configured to store instructions executable by the processor. The processor is configured to implement the method for determining a network switching resource as described in any above embodiment.

According to the embodiment of the disclosure, an electronic device includes: a processor; and a memory configured to store instructions executable by the processor. The processor is configured to implement the method for determining a network switching resource as described in any above embodiment.

According to the embodiment of the disclosure, a computer readable storage medium is stored with a computer program thereon. The program implements the steps of the method for determining a network switching resource as described in any above embodiment when executed by a processor.

According to the embodiment of the disclosure, a computer readable storage medium is stored with a computer program thereon. The program implements the steps of the method for configuring a network switching resource as described in any above embodiment when executed by a processor.

Figure 18:
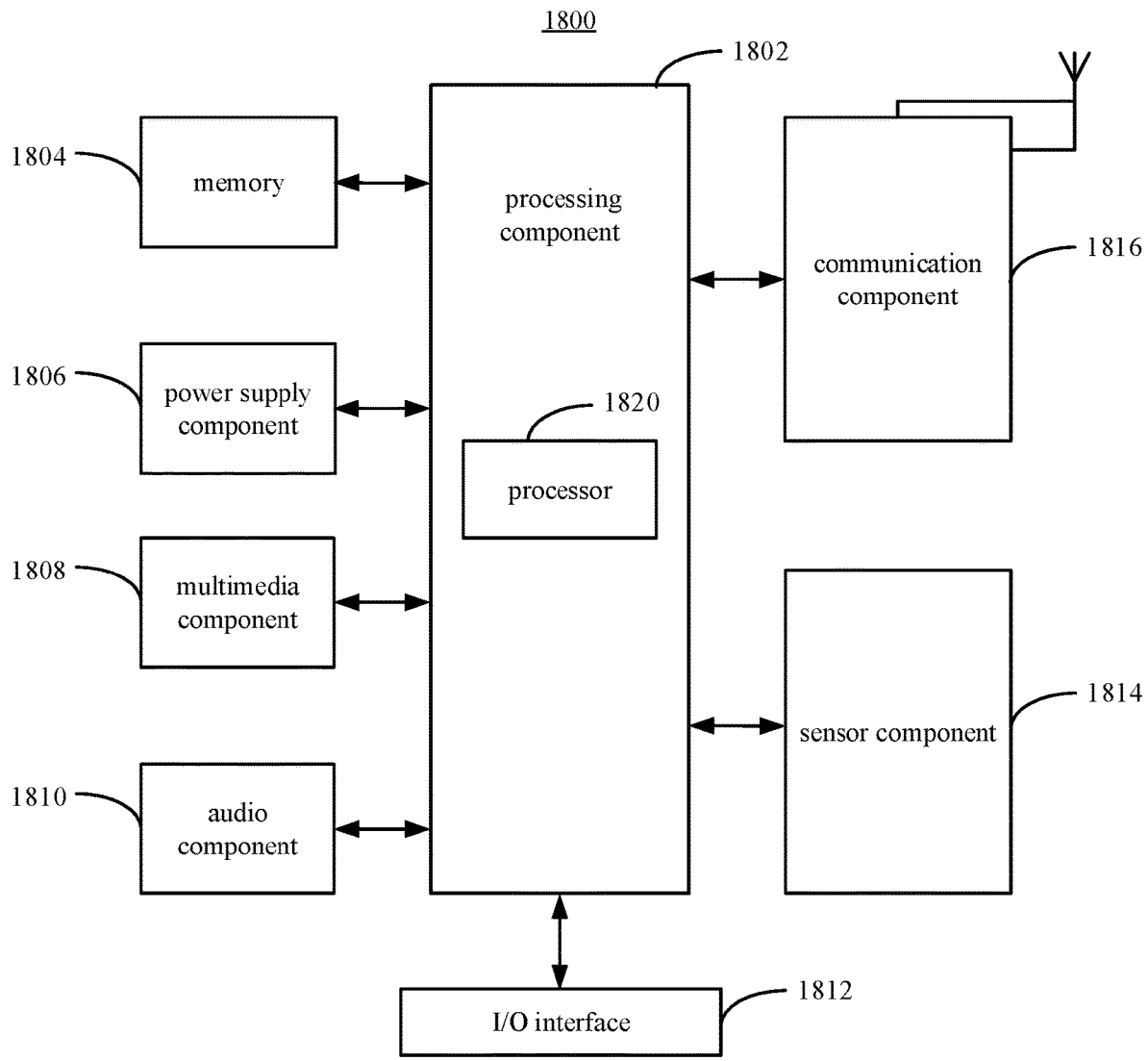
FIG. 18 is a schematic block diagram illustrating a device for determining a network switching resource in the embodiment of the disclosure.

FIG. 18 is a schematic block diagram illustrating a device 1800 for determining a network switching resource in the embodiment of the disclosure. For example, the device 1800 may be a mobile phone, a computer, a digital broadcasting terminal, a messaging device, a game console, a tablet device, a medical equipment, a fitness equipment, a personal digital assistant, etc.

As illustrated in FIG. 18, the device 1800 may include one or more components: a processing component 1802, a memory 1804, a power supply component 1806, a multimedia component 1808, an audio component 1810, an input/output (I/O) interface 1812, a sensor component 1814, and a communication component 1816.

The processing component 1802 generally controls the whole operation of the device 1800, such as the operations related to display, phone call, data communication, camera operation and recording operation. The processing component 1802 may include one or more processors 1820 to perform instructions, to complete all or part of blocks of the above method for determining a network switching resource. In addition, the processing component 1802 may include one or more modules for the convenience of interaction between the processing component 1802 and other components. For example, the processing component 1802 may include a multimedia module for the convenience of interaction between the multimedia component 1808 and the processing component 1802.

The memory 1804 is configured to store all types of data to support the operation of the device 1800. Examples of the data include the instructions of any applications or methods operated on the device 1800, contact data, phone book data, messages, pictures, videos, etc. The memory 1804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 1806 may provide power supply for all components of the device 1800. The power supply component 1806 may include power supply management system, one or more power supplies, and other units related to generating, managing and distributing power for the device 1800.

The multimedia component 1808 includes an output interface screen provided between the device 1800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 1808 includes a front camera and/or a rear camera. When the device 1800 is in an operation mode, such as a shooting mode or a video mode, the front camera and/or the rear camera may receive external multimedia data. Each front camera and rear camera may be a fixed optical lens system or an optical lens system with a focal length and an optical zoom capacity.

The audio component 1810 is configured to output and/or input a signal. For example, the audio component 1810 includes a microphone (MIC). When the device 1800 is in operation mode, such as call mode, record mode, and speech recognition mode, the microphone is configured to receive the external audio signals. The audio signal received may be further stored in the memory 1804 or sent via the communication component 1816. In some embodiments, the audio component 1810 further includes a speaker configured to output an audio signal.

The I/O interface 1812 provides an interface for the processing component 1802 and the peripheral interface module, and the peripheral interface module may be a keyboard, a click wheel, a button, etc. The button may include but not limited to a home button, a volume button, a start button and a lock button.

The sensor component 1814 includes one or more sensors, configured to provide various aspects of status assessment for the device 1800. For example, the sensor component 1814 may detect the on/off state of the device 1800 and the relative positioning of the component. For example, the component is a display and a keypad of the device 1800. The sensor component 1814 may further detect the location change of the device 1800 or one component of the device 1800, the presence or absence of contact between the user and the device 1800, the orientation or acceleration/deceleration of the device 1800, and the temperature change of the device 1800. The sensor component 1814 may include a proximity sensor configured to detect the existence of the objects nearby without any physical contact. The sensor component 1814 may further include a light sensor such as CMOS or CCD image sensor, which is configured to use in imaging applications. In some embodiments, the sensor component 1814 may further include an acceleration transducer, a gyroscope sensor, a magnetic sensor, a pressure sensor or a temperature sensor.

The communication component 1816 is configured for the convenience of wire or wireless communication between the device 1800 and other devices. The device 1800 may access wireless networks based on communication standard, such as WiFi, 2G or 3G, or their combination. In an example embodiment, the communication component 1816 receives a broadcast signal or broadcast-related information from an external broadcast management system via a broadcast channel. In an example embodiment, the communication component 1816 further includes a near field communication (NFC) module to facilitate short-range communication. For example, the NFC module may be achieved based on an RFID technology, an IrDA technology, a UWB technology, a BT technology and other technologies.

In an example embodiment, the device 1800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method for determining a network switching resource.

In an example embodiment, a non-temporary computer readable storage medium including instructions is further provided, such as the memory 1804 including instructions, the instructions may be executed by the processor 1820 of the device 1800 to complete the above method for determining a network switching resource. For example, the non-temporary computer readable storage medium may be a ROM, a random access memory (RAM), a CD-ROM, a magnetic tape, a floppy disk, an optical data storage device, etc.

Figure 19:
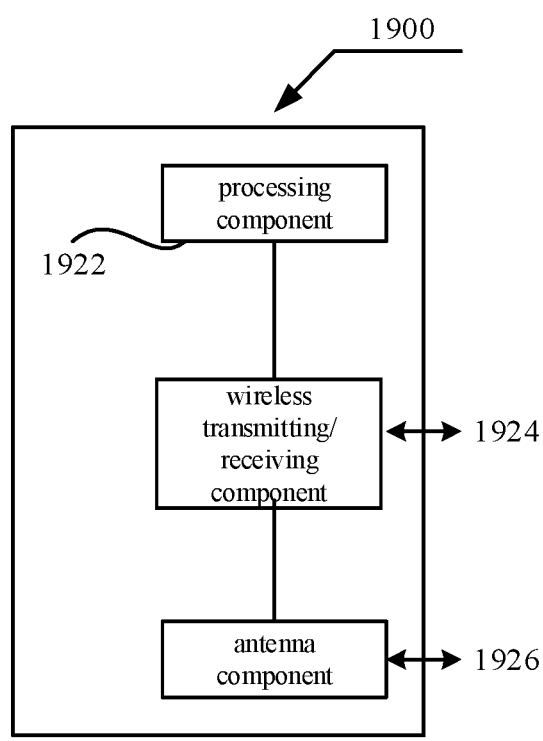
FIG. 19 is a schematic block diagram illustrating a device for configuring a network switching resource in the embodiment of the disclosure.

FIG. 19 is a schematic block diagram illustrating a device 1900 for configuring a network switching resource in the embodiment of the disclosure. As illustrated in FIG. 19, the device 1900 includes a processing component 1922, a wireless transmitting/receiving component 1924, an antenna component 1926 and a signal processing part peculiar to a wireless interface. The processing component 1922 may further include one or more processors. One processor in the processing component 1922 is configured to implement the method for configuring a network switching resource as described in the any above embodiment.

After considering the specification and practicing the disclosure herein, those skilled in the art will easily think of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

It should be noted that relational terms such as first and second are used herein to distinguish one entity or operation from another without necessarily requiring or implying any such actual relationship or sequence between the entities or operations. The terms "comprising", "comprise" or any other variations are intended to cover a non-exclusive inclusion, such that a process, a method, an article, or a device that includes a series of elements not only includes the elements, but also includes other elements not expressly listed, or elements inherent to such a process, a method, an article, or a device. In the absence of more restrictions, the elements defined by a sentence "comprising one . . ." do not exclude the presence of additional identical elements in a process, a method, an article, or a device that includes the elements.

The method and the apparatus provided in the embodiment of the disclosure are described above. The principle and implementation of specific examples of the disclosure are elaborated herein. The description of the above embodiments is merely configured to help understand the method and the core idea of the disclosure. At the same time, for those skilled in the art, in accordance with the idea of the disclosure, specific implementations and application ranges may vary. In summary, the contents of the specification shall not be understood as a limitation of the disclosure.

What is claimed is:

1. A method for determining a network switch resource, applicable to a terminal that is connected to at least two operator networks, the method comprising:
   receiving first configuration information sent by a first operator network;
   determining a preset duration for disconnection from the first operator network based on the first configuration information; and
   disconnecting from the first operator network and performing activities in a second operator network for a duration less than or equal to the preset duration and with a preset limit moment as a boundary.

2. The method of claim 1, wherein the preset duration is a duration within a unit time period.

3. The method of claim 1, further comprising:
   determining a preset number of times for disconnection from the first operator network based on the first configuration information.

4. The method of claim 3, wherein disconnecting from the first operator network and performing activities in the second operator network for the duration less than or equal to the preset duration and with the preset limit moment as a boundary, comprises:
   disconnecting from the first operator network and performing activities for the preset number of times in the second operator network with the preset limit moment as a boundary, in which a duration of performing activities for the preset number of times is less than or equal to the preset duration.

5. The method of claim 3, wherein disconnecting from the first operator network duration and performing activities in the second operator network for the duration less than or equal to the preset and with the preset limit moment as a boundary, comprises:
   disconnecting from the first operator network and performing activities for the preset number of times in the second operator network with the preset limit moment as a boundary, in which a duration of performing activities for each time is less than or equal to the preset duration.

6. The method of claim 3, wherein the preset number of times comprises a number of times within a unit time period.

7. The method of claim 1, further comprising:
   receiving second configuration information sent by the second operator network; and
   determining the preset limit moment based on the second configuration information.

8. The method of claim 1, further comprising:
   sending indication information to the first operator network, wherein the indication information is configured to indicate that the terminal is connected to the at least two operator networks.

9. The method of claim 1, wherein, the limit moment comprises at least one of a start moment and an end moment.

10. An apparatus for determining a network switch resource, applicable to a terminal for connecting at least two operator networks, the apparatus comprises:
    a processor; and
    a memory configured to store instructions executable by the processor;
    wherein the processor is configured to:
    receive first configuration information sent by the first operator network;
    determine a preset duration for disconnection from the first operator network based on the first configuration information; and
    for a duration less than or equal to the preset duration and with a preset limit moment as a boundary, disconnect from the first operator network and perform activities in a second operator network of the at least two operator networks.

* * * * *